March 28, 1944.    E. B. PHILLIPS    2,345,069
COLLET CHUCK
Filed May 15, 1942

Inventor
Ellsworth B. Phillips
By
Lloyd Spencer
Attorney.

Patented Mar. 28, 1944

2,345,069

UNITED STATES PATENT OFFICE 2,345,069

COLLET CHUCK

Ellsworth B. Phillips, Los Angeles, Calif.

Application May 15, 1942, Serial No. 443,118

6 Claims. (Cl. 279—52)

My invention relates to collet chucks, and among the objects of my invention are:

First, to provide a collet chuck which is particularly adapted for mounting on the spindle of a lathe, but may be used with milling machines and other machine tools.

Second, to provide a collet chuck which enables the full diameter of the bore in the drive spindle of a lathe to be utilized; that is, the collet chuck is adapted to receive collets equal to the diameter of the spindle bore so that any work piece which is capable of passing through the spindle bore may be held by the collet chuck, thereby increasing the capacity of a given size lathe.

Third, to provide a collet chuck which may be operated to loosen or tighten the work piece without stopping the lathe spindle, thereby lending itself particularly to quantity production operations.

Fourth, to provide a collet chuck which incorporates a collet of particularly simple and inexpensive construction and which may be readily interchanged.

Fifth, to provide a collet chuck having a dual collet compression means tending to distribute the pressure of the gripping portions of the collet uniformly against the work piece.

With the above and other objects in view as may appear hereinafter, reference is directed to the accompanying drawing in which.

Figure 1:
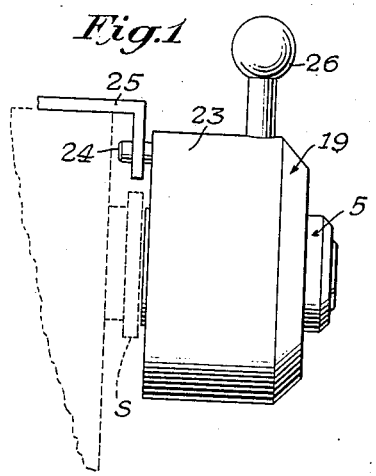
Figure 1 is a side view of my collet chuck, shown on a lathe.
Figure 2:
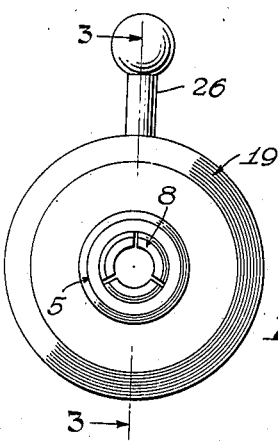
Figure 2 is an end elevational view thereof.
Figure 3:
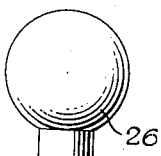
Figure 3 is an enlarged transverse sectional view of the collet chuck taken through 3—3 of Fig. 2.
Figure 4:
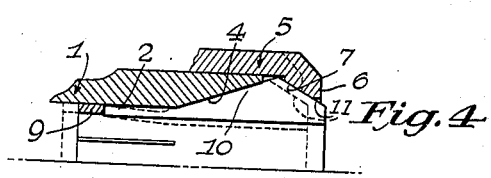
Figure 4 is a fragmentary transverse sectional view similar to Fig. 3 showing the collet and construction elements and indicating in exageration by dotted lines the manner in which the collet is compressed.

My collet chuck is shown mounted on the spindle S of a lathe, but may be mounted on the spindle of other machine tools or in the index head of a shaper or milling machine; however, certain features of my invention as will be brought out hereinafter lend themselves particularly for use on a rotating member such as the lathe spindle.

The spindle S of a conventional lathe is provided with a bore S1 and its operating end forms a nose S2 which is externally threaded. My collet chuck includes a tubular spindle extension or mandrel 1 having a bore 2 one end of which is counterbored and internally threaded as indicated by 3. The normal portion of the bore 2 is slightly larger than the bore S2 of the spindle and its outer or extended end is tapered as indicated by 4.

Fitted over the extended end of the spindle extension 1 is a sleeve or collet constrictor 5 which projects beyond the spindle extension and is provided with an internal flange 6 having a tapered bore 7. The sleeve element 5 is supported on the spindle extension 1 to turn freely thereon when in the collet release position. It will be understood, of course, that when the sleeve 5 is in operative engagement with the collet, i. e., with the collet constricted, it rotates therewith, being frictionally driven by the collet which latter in turn is frictionally driven by the spindle extension 1. The principal virtue of mounting the sleeve for rotation on the spindle 1 resides in the facility with which it may be removed therefrom and without stopping the machine, whenever it is necessary to substitute a collet of different size. This sleeve is removable from the spindle extension by axial displacement therealong, in which operation the outer shell or housing member is first to be unscrewed from the shell member 18. The tapered bores 4 and 7 of the spindle extension and sleeve diverge toward each other and the degree of taper of the bore 7 is greater than that of the bore 4.

Figure 5:
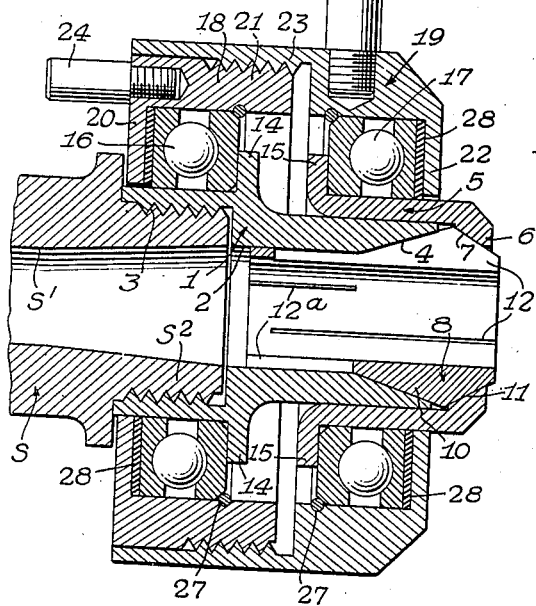
Figure 5 is a longitudinal view through a collet for small diametered work; and, Figure 6 is a perspective view of the collet used in my collet chuck.
Figure 5:
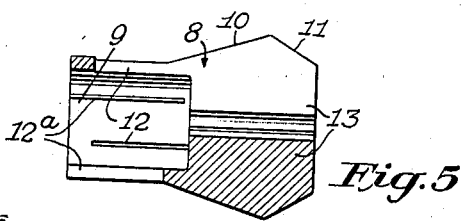
Figure 6:
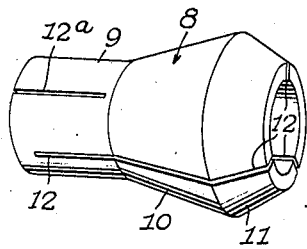

The spindle extension 1 receives a collet 8 which may have a bore equal to the bore S2 of the spindle S. The collet comprises a short stem portion 9 fitting the normal bore 2, and has a tapered outer portion 11 conforming to the tapered bore 7. The collet is provided with longitudinal slots 12 extending from its forward end almost to its rear extremity and between these other longitudinal slots 12a extending forwardlly from the rear end of the stem so that the segments thus formed may be pressed radially inwardly. The outer portion of the collet bore may be provided with a constriction 13 of predetermined diameter as shown in Fig. 5 to accommodate work pieces smaller than the spindle bore S2.

The relative tapers of the bores 4 and 7 and the corresponding portions of the collet are such that the gripping portion of the collet forwardly of its stem 9 moves radially inwardly parallel to the surface of the work piece and in a manner to exert uniform pressure on the work piece from the forward to the rear extremity of the gripping portion. The taper of the outer portion 11 is greater than the taper of the inner portion 10 for the reason that less force is required on the outer end of the collet than is required on the mid-portion in order to exert the same pressure.

The extension 1 and sleeve 5 are provided with confronting external flanges 14 and 15, and inwardly of the flange 14 the extension 1 carries a thrust bearing 16 while outwardly of the flange 15 the sleeve 5 carries a thrust bearing 17. The thrust bearings are adapted to be urged toward each other so as to draw the flanges 14 and 15 together and thereby compress the collet between the tapered portions 4 and 7.

The thrust bearings 16 and 17 are covered by shell members 18 and 19 respectively. The shell member 18 has an internal flange 20 adapted to bear against the side of the thrust bearing 16 adjacent the lathe headstock and an externally threaded cylindrical portion 21. Similarly, the shell member 19 has an internal flange 22 which overhangs the outer side of the thrust bearing 17 and a cylindrical portion 23 covering the thrust bearing. The cylindrical portion 23 projects rearwardly beyond the bearing 17 and is counterbored and internally threaded to fit the cylindrical portion 21.

The shell member 18 is provided with a pin 24 adapted to be anchored to the lathe headstock in any suitable manner. A bracket 25 suitably secured to the headstock may be employed. The shell member 19 is provided with a radially extending handle 26.

Split retainer rings 27 hold the thrust bearings 16 and 17 in their respective shells.

The threaded connection between the shells 18 and 19 causes the tapered portions 4 and 7 to be drawn toward each other and compress the collet upon the work piece when the shell 19 is turned one direction and to release the collet when the shell 19 is turned the other direction. By reason of the thrust bearings, the shells 18 and 19 do not rotate with the lathe spindle, the pin 24 preventing any slight tendency to rotate that might exist. The direction of the pitch of the thread between the shells is such in relation to the direction of rotation of the spindle that any friction between the parts tends to tighten rather than loosen the collet.

Yieldable disks 28 of rubber or similar material may be interposed between the thrust bearings 16 and 17 and the corresponding end flanges 20 and 22 of the shells to cushion the operation.

Collets may be readily interchanged by unscrewing the shell 19 from the shell 18 and sliding the sleeve from the spindle extension. To facilitate working close to collet chuck, the collet projects slightly from the sleeve 5 and the sleeve projects from the shell 19.

By reason of the fact that the entire collet chuck is mounted on the forward end or nose of the lathe spindle and no parts need extend through the spindle, the full diameter of the spindle bore may be utilized to feed work into the collet. Furthermore, by reason of the fact that the housings or shells do not rotate, the collet may be released, tightened, or removed for replacement by a collet of different size without stopping rotation of the spindle. This feature may be utilized whether the work is fed forwardly through the spindle, or separate pieces are inserted into the front end of the collet, and materially speeds up the work done on the lathe, particularly in those operations requiring only a few minutes on each piece and the time required to stop and start the lathe becomes a factor.

Though I have shown and described a certain embodiment of my invention, I do not wish to be limited thereto, but desire to include all novelty inherent in the appended claims.

I claim:

1. A collet chuck comprising: a collet mandrel adapted to mount on and extend from a rotatable element of a machine tool, said collet mandrel having a tapered bore diverging toward its extended end; a collet including segmental tapered portions fitting said bore and yieldable means connecting and tending to spread said segmental portions; a collet constrictor rotatably and telescopically mounted on said collet mandrel and overhanging the outer end of said bore to bear against the outer or larger end of said collet and urge the collet into said bore; a pair of complementary shell members including coacting means for moving said shell members axially with respect to each other upon relative rotation of said shell members; antifriction bearings mounting said shell members upon said collet mandrel and constrictor respectively, said shell members operable through said bearings and collet constrictor to urge said collet into said bore to thereby constrict said collet segments; and means for restraining said shell members against rotation under urge of said rotatable element.

2. In a collet chuck adapted to be mounted on the threaded end of a lathe spindle: a spindle extension screw-threaded onto said lathe spindle and having a bore extending coaxially therefrom; a sleeve rotatably mounted on and axially slidable over said spindle extension and having an internal flange at its extended end overhanging the extremity thereof, the confronting portions of said bore and flange being tapered and diverging toward each other; a collet fitting said bore and having complementary tapered portions engageable by the tapered portions of said bore and internal flange, said internal flange defining an opening of greater diameter than said bore and less in width than the corresponding tapered portion of said collet, whereby said collet protrudes outwardly beyond said internal flange; said spindle extension and sleeve having confronting external flanges at the midportion of said spindle extension and axially inner extremity of said sleeve, respectively; a pair of housing members including a screw-threaded connection therebetween, and internal flanges at the axial extremities of said housing members axially overlapping said external flanges; and thrust bearings positioned between said external and internal flanges.

3. A collet chuck comprising in combination; a hollow spindle member having a tapered socket at one end, a sleeve rotatably supported on said member in telescopic relation therewith and formed with a reversely tapered flange which overhangs the said one end of the spindle member, a contractible spring-jaw collet having oppositely tapered zones adapted to coact with tapered portions of said member and of said sleeve flange, a longitudinally contractible actuator swiveled on said member and said sleeve to constitute a housing, opposed anti-friction thrust bearings interposed between the actuator and said member and sleeve respectively, and means indifferent to relative rotation between the actuator on the one hand and the member and sleeve on the other hand for contracting said actuator longitudinally to contract the collet upon the work.

4. A collet chuck comprising in combination; a hollow rotary spindle having a tapered socket at one end of its bore, a sleeve rotatably supported on said spindle in telescopic relation therewith, the said sleeve being formed with a reversely tapered flange which overhangs the tapered socket of said spindle; a contractible spring-jaw collet having oppositely tapered zones adapted to coact with the tapered socket of said spindle and with the tapered portion of said sleeve flange; a longitudinally contractible actuator swiveled on said member and sleeve; opposed anti-friction thrust bearings interposed between the actuator on the one hand and said member and sleeve respectively; means to restrain said actuator against rotation, and means operable to contract said actuator longitudinally in order to contract the jaws of the collet.

5. A collet chuck for use on rotary spindles and adapted to permit interchange of collets as well as collet engagement and release of work while the spindle rotates, said chuck comprising in combination; a rotary spindle having a tapered collet receiving socket; a tapered spring-jaw collet fitting therein; a sleeve in telescopic relation with said spindle, rotatably supported thereon, and having a collet-engaging flange; a two-part actuator having a first part swiveled on the spindle and a second part separable therefrom swiveled on the sleeve; means for holding the first part of the actuator against rotation; and manually operable means for connecting the two parts of the actuator and for drawing them together in the direction of the spindle axis to cause the flange on the sleeve to force the collet into the spindle socket.

6. A collet chuck comprising in combination; a hollow rotary spindle having a tapered socket at one end; a sleeve in telescopic relation with said spindle, rotatably supported thereon and formed with a reversely tapered flange which overhangs said one end of the spindle; a contractible spring-jaw collet having oppositely tapered zones adapted to coact with the tapered socket of said spindle and with the tapered portion of said flange; a first actuator member swiveled on said spindle and including means to restrain the member against rotation; an anti-friction thrust bearing between said first actuator member and said spindle; a second actuator member swiveled on said sleeve and normally in threaded engagement with the first actuator member; and an anti-friction thrust bearing between the second actuator member and said sleeve; the parts being so constructed and arranged that the second actuator may be unscrewed from the first actuator whereby said sleeve and collet are readily removable from the spindle while the latter rotates.

ELLSWORTH B. PHILLIPS.